United States Patent [19]
Caunt

[11] 3,969,269
[45] July 13, 1976

[54] OLEFINE POLYMERIZATION CATALYST INCORPORATING AN ORGANO-PHOSPHORUS COMPOUND

[75] Inventor: Anthony David Caunt, Welwyn Garden City, England

[73] Assignee: Imperial Chemical Industries Limited, London, England

[22] Filed: June 3, 1974

[21] Appl. No.: 475,840

Related U.S. Application Data

[63] Continuation-in-part of Ser. No. 268,505, July 3, 1972, abandoned.

[30] Foreign Application Priority Data

July 13, 1971 United Kingdom............... 32856/71

[52] U.S. Cl................... 252/429 B; 260/283 P; 260/288 R; 260/346.1 R; 260/290 R; 260/296 R; 260/347.7; 260/289 R; 260/297 P; 260/583 E; 260/606.5 P; 260/931; 260/948; 260/949; 260/950; 260/951; 526/123; 526/135; 526/139; 526/349; 526/352

[51] Int. Cl.²...................... C08F 4/52; C08F 4/64; C08F 4/68

[58] Field of Search ............................... 252/429 B

[56] References Cited
UNITED STATES PATENTS

| | | | |
|---|---|---|---|
| 3,186,977 | 6/1965 | Coover et al.............. | 252/429 B X |
| 3,484,424 | 12/1969 | Moberly................... | 252/429 B X |
| 3,511,891 | 5/1970 | Taylor et al............. | 252/429 B X |
| 3,634,340 | 1/1972 | Gunther et al............ | 252/429 B X |
| 3,658,779 | 4/1972 | Kahle et al.............. | 252/429 B X |

*Primary Examiner*—Patrick P. Garvin
*Attorney, Agent, or Firm*—Cushman, Darby & Cushman

[57] ABSTRACT

An olefine polymerization catalyst comprising (1) a solid compound of a transition metal wherein the said metal has a valency below its maximum, (2) an organo-metallic compound of aluminium, or of a non-transition metal of Group II of the Periodic System, or a complex of an organo-metallic compound of a non-transition metal of Group I or II of the Periodic System and an organo-aluminium compound; and (3) a trivalent phosphorus compound of the formula

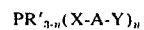

$$PR'_{3-n}(X-A-Y)_n$$

wherein
R' is halogen, a hydrocarbyl group or the group —NR₂ or —OR;
X is —O—, —S—, or —NR—;
A is a bivalent organic radical such that X and Y are separated by not more than 3 carbon atoms;
Y is —OR, —SR, —NR₂, —PR₂ or a heterocyclic ring system whereof the heteroatom is O, S, N or P; and
n is 1, 2 or 3. The phosphorus compound can be ball-milled with the transition metal component of the catalyst. The catalyst may also include an electron donor compound of a known type such as isoquinoline, tetramethylene-diamine or triphenyl phosphone oxide. When used to polymerize olefine monomers such as propylene, the production of soluble polymer is decreased.

30 Claims, No Drawings

OLEFINE POLYMERIZATION CATALYST INCORPORATING AN ORGANO-PHOSPHORUS COMPOUND

This is a continuation of application Ser. No. 268,505 filed July 8, 1972 now abandoned.

The present invention relates to catalysts for the polymerisation of olefines and in particular to materials suitable for use as the third component in such catalysts and catalysts including such third components.

The low pressure polymerisation of olefines, particularly ethylene and propylene, to give high molecular weight polymers has been practised commercially for several years. The catalyst used for such polymerisations is commonly referred to as a "Ziegler" catalyst and this type of catalyst comprises a compound of a transition metal and an organo-metallic compound of aluminium or an element of Group I or II.

In order to obtain polymers having a high proportion of crystallinity the catalysts used normally comprise a solid compound of a transition metal, wherein the transition metal has a valency below its maximum, together with the organo-metallic compound. The transition metal compound is usually a halide and for the production of crystalline polymers the most widely used compound is titanium trichloride, which term is used to include pure titanium trichloride and also impure titanium trichloride associated or combined with other compounds, typically aluminium chloride, and produced by the reduction of titanium tetrachloride with, for example, aluninium metal or organo-aluminium compounds. The most extensively used organo-metallic compound is an organo-aluminium compound such as an aluminium trialkyl or an aluminium dialkyl halide.

Propylene can be polymerised with titanium trichloride and an organo-aluminum compound to give a high yield of polymer based on the catalyst used. However, the polymer produced still contains appreciable quantities of catalyst residues and for most applications it is necessary to remove most of these catalyst residues, this being done by washing with a suitable reagent to remove the catalyst. Typically, the polymer is first treated with an alcohol to terminate catalytic activity and then washed several times with water to remove the catalyst. Such catalyst removal operations increase the cost of producing the polymer.

Attempts have been made to eliminate the need to remove catalyst residues by polymerising the monomer to give a yield of polymer based on catalyst used which is considerably in excess of the yield normally obtained. When polymerising to such high yields the amount of catalyst remaining in the polymer is relatively small, for example, less than 50 parts per million by weight based on the polymer obtained. A disadvantage of polymerising to very high yields is that the polymer obtained has a tendency to contain a higher proportion of soluble polymer than is contained in polymer produced in the more normal yields.

Attempts have been made to reduce the proportion of soluble polymer produced by including a third component in the catalyst system. Whilst some of these third components do reduce the amount of soluble polymer produced, in many cases the polymerisation rate is adversely affected by the third component.

According to the present invention there is provided an olefine polymerisation catalyst comprising (1) a solid compound of a transition metal wherein the said metal has a valency below its maximum, (2) an organometallic compound of aluminium, or of a non-transition metal of Group II of the Periodic System, or a complex of an organo-metallic compound of a non-transition metal of Group I or II of the Periodic System and an organo-aluminium compound; and (3) a trivalent phosphorus compound of the formula

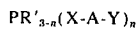

wherein
R' is halogen, a hydrocarbyl group or the group $-NR_2$ or $-OR$ where R is a hydrocarbyl group:
X is $-O-$, $-S-$, or $-NR-$;
A is a bivalent organic radical such that X and Y are separated by not more than 3 carbon atoms;
Y is $-OR$, $-SR$, $-NR_2$, $-PR_2$ or a heterocyclic ring system whereof the heteroatom is O, S, N or P; and
n is 1, 2 or 3.

The transition metal is a metal of of Groups IVA to VIII of the Periodic Table and can be for example, titanium, zirconium or vanadium. The preferred transition metal is titanium and it is particularly preferred to use titanium trichloride, especially a solid solution of titanium trichloride with aluminium chloride, for example the compound obtained by reduction of $TiCl_4$ with aluminium metal as described in British Pat. Specification No. 855 070, as component (1) of the catalyst. Component (2) can include Grignard reagents which are substantially ether free, $Mg(AlEt_4)_2$ or $Mg(C_6H_5)_2$. The aluminium compound can be lithium aluminium tetra alkyl and is preferably an aluminium hydrocarbyl halide, an aluminium hydrocarbyl sulphate, an aluminium hydrocarbyl oxyhydrocarbyl or particularly an aluminium trihydrocarbyl or dihydrocarbyl aluminium hydride such as an aluminium trialkyl or dialkyl aluminium hydride, especially aluminium triethyl since catalysts including aluminium triethyl give a high polymerisation rate. Optionally the catalyst can include zinc hydrocarbyl compounds such as zinc diethyl or, in the presence of organo-aluminium compounds, zinc salts such as zinc chloride.

Thus, preferred catalysts in accordance with the present invention comprise (1) titanium trichloride, (2) an aluminium trihydrocarbyl or dihydrocarbyl aluminium hydride, preferably aluminium triethyl and, (3) a trivalent phosphorus compound of the formula

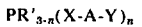

where R', X, A. Y and n are all as hereinbefore defined.

In the phosphorus compound each hydrocarbyl group R is preferably an alkyl group such as methyl or ethyl. The group R' is conveniently an alkoxy group or a dialkyl amino group.

The group (X-A-Y) can be, for example, an alkyl glycol, an alkanolamino, a diamino or an aminothiol group. Y can be derived from a heterocyclic compound such as pyridine, quinoline, isoquinoline furan, tetrahydrofuran etc. We have obtained satisfactory polymerisation systems using, as the phosphorus compound, materials in which n has the value 1, 2 or 3.

The phosphorus compound which is used as the third component of the catalyst may be a compound of formulae I to VIII:

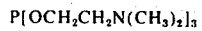
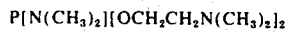
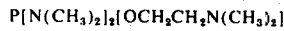

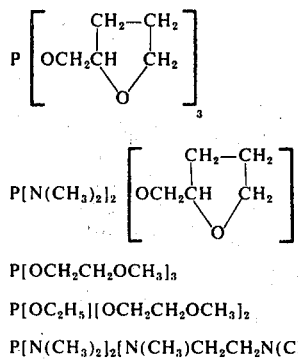

$$P\left[OCH_2\overset{CH_2-CH_2}{\underset{O}{CH}}CH_2\right]_3 \quad IV$$

$$P[N(CH_3)_2]_2\left[OCH_2\overset{CH_2-CH_2}{\underset{O}{CH}}CH_2\right] \quad V$$

$$P[OCH_2CH_2OCH_3]_3 \quad VI$$

$$P[OC_2H_5][OCH_2CH_2OCH_3]_2 \quad VII$$

$$P[N(CH_3)_2]_2[N(CH_3)CH_2CH_2N(CH_3)_2] \quad VIII$$

As a further aspect the present invention also includes an olefine polymerisation process which comprises polymerising at least one olefine monomer using an olefine catalyst in accordance with the present invention.

More particularly an olefine monomer is polymerised using a catalyst comprising (1) a solid compound of a transition metal wherein the said metal has a valency below its maximum, preferably titanium trichloride, (2) an organo-metallic compound of aluminium or of a non-transition metal of Group II of the Periodic System, or a complex of a non-transition metal of Group I or II of the Periodic System and a organo-aluminium compound and is particularly an aluminium hydrocarbyl halide; an aluminium hydrocarbyl sulphate; an aluminium hydrocarbyl oxyhydrocarbyl or preferably an aluminium trihydrocarbyl or aluminium dihydrocarbyl hydride compound especially aluminium triethyl, and (3) a trivalent phosphorus compound of the formula $$PR'_{3-n}(X-A-Y)_n$$

where A, R', X, Y and n are all as hereinbefore defined.

The phosphorus compound may be a compound of formulae I to VIII as hereinbefore defined.

Any olefin monomer which is capable of being polymerised using a Ziegler catalyst may be polymerised using the process of the present invention. Thus, olefine monomers which may be polymerised by the present process include butene-1 and 4-methyl pentene-1 and particularly propylene.

We have found that the present process can be used for the polymerisation of propylene to give a high rate of polymerisation and a relatively low proportion of soluble polymer.

Thus, if propylene at a partial pressure of one atmosphere is polymerised using a catalyst comprising titanium trichloride, aluminium triethyl and a phosphorus compound of formulae I, II or V, the yield of solid polymer obtained can be in excess of 30 gms of polymer/millimole of $TiCl_3$ in the catalyst with the amount of soluble polymer produced being less than 15% by weight of the total polymer. Without the phosphorus compound and under otherwise the same conditions the yield of solid polymer is about 35 gms/millimole of $TiCl_3$, but the amount of soluble polymer is about 29% by weight. Thus, the addition of the phosphorus compound has produced a substantial reduction in the proportion of soluble polymer produced to give a more acceptable proportion of soluble polymer. Generally the rate of polymerisation is also reduced by the addition of the phosphorus compound, but this reduction in rate is not such as to render the catalyst too inactive for satisfactory use, and indeed in some cases the phosphorus compound actually increases the yield of the desired solid polymer, for example such an effect is obtained using a compound of formula II which gives a yield of solid polymer of about 39 gms/millimole of $TiCl_3$ under certain circumstances coupled with about 13.5% of soluble polymer.

The titanium trichloride used in the foregoing tests was the reduction product of titanium tetrachloride with aluminium. It has been found that the polymerisation rate and proportion of soluble polymer formed is dependent on the nature of titanium trichloride used and although the use of the reaction product of titanium tetrachloride and aluminium alkyl sesquihalide can give a higher yield of solid polymer, a higher proportion of soluble polymer is also obtained with such catalysts.

The proportion of the phosphorus compound also effects the rate of polymerisation and proportion of soluble polymer produced. Furthermore, the effect of the phosphorus compound is dependent on the number of heteroatoms (that is O, S, N or P) present in the compound and in particular we have found that compounds containing O and/or N usually complex more strongly with the organo-metallic compounds such as the organo-aluminium compounds than with the transition metal of the transition metal compound such as titanium. Thus, using an organo-aluminium compound, the number of functional groups containing O and/or N should not exceed the amount of the aluminium compound and usually should be kept considerably less, for example 0.25 to 0.5 the amount of the aluminium compound. However, using the phosphorus compound in an amount such that the ratio of functional groups to transition metal, particularly Ti, is <0.25 does not produce the best catalyst. Thus, the minimum proportion of the phosphorus compound is dependent on the transition metal concentration and the upper limit is related to the concentration of the organo-metallic compound. More specifically, with a catalyst in which contains phosphorus compound contins f functional groups (that is O or N) per molecule, if the concentration of titanium trichloride is $C_T$ millimoles/liter and the concentration of aluminium triethyl is $C_A$ millimoles/liter, the concentration of the third component is preferably in the range $$\frac{C_T}{4f} \text{ to } \frac{C_A}{2f} \text{ millimoles/litre.}$$

Thus, if the basic catalyst system comprises 2 millimoles/liter of $TiCl_3$ and 4 millimoles/liter of aluminium triethyl, the concentration of a third component containing 2 functional groups (that is, O or N atoms) per molecule is preferably in the range 0.25 to 1 millimole/liter and for a third component containing 4 functional groups, the concentration is preferably in the range of 0.125 to 0.5 millimole/liter.

In carrying out polymerisations using catalysts in accordance with the invention the proportion of catalyst used is small in comparison to the amount of monomer being polymerised and thus is very susceptible to any impurities present in the system. Accordingly, in order to obtain the best possible results, all the materials used should be of high purity and all apparatus should be clean and free from any contamination which could affect the catalyst. Although the monomers and diluents used in the commercial production of polyolefines are sufficiently pure for use in the commercial processes, we find it is preferable to subject these materials, particularly the monomer, to a further purification treatment in order to obtain the best results. Many techniques are known for the purification of gases and liquids and any appropriate technique can be used. The technique used will depend in part on the purity of the starting materials and may involve the use of one or more stages. One purification technique which can be used is to contact the monomer, or diluent, with a material which is capable of absorbing impurities from the monomer or diluent, for example as described in British Pat. specifications Nos. 1 111 493 and 1 226 659.

The catalysts of the present invention can be used to effect polymerisation in the presence of an inert diluent, for example, a paraffinic hydrocarbon, or in the absence of a diluent when polymerisation is effected either in the presence of excess liquid monomer or by contacting a gaseous monomer with the solid catalyst using any appropriate technique for effecting a gas/solid reaction such as a fluidised bed reactor.

The activity of the catalyst system may be increased by the use of the solid transition metal compound in a finely divided form. Suitable finely divided transition metal compounds can be obtained by grinding and very conveniently the grinding is effected by ball-milling the transition metal compound dry, for example as described in British Pat. specifications Nos. 852 691 and 927 785.

We have found that useful improvements in the catalyst system are obtained if the transition metal component is ground, preferably ball-milled, together with an additional catalyst component. This additional component can be a phosphorus compound as hereinbefore defined. Alternatively, the additional component can be an electron donor compound of the type known to affect the catalyst activity and/or stereospecificity, such materials including amines, heterocyclic amines such as pyridine and quinoline, diamines, alkanolamines, amides, urea and derivatives thereof, organophosphorus compounds such as phosphines, phosphine oxides, phosphites and phosphates, organo-silicon compounds such as silanes and siloxanes, ethers, esters, ketones, alcohols and the sulphur containing analogues of such compounds such as thioethers, etc.

In addition to grinding the transition metal compound with an additional compound, a further quantity of the same, or a different, additional compound can be included in the catalyst system after the completion of the grinding step. This further addition of the additional component can produce a further improvement in the catalyst system and is a particularly preferred type of catalyst. It will be appreciated that in the foregoing catalyst systems, the phosphorus compounds as hereinbefore defined will be included either as the additional component ground with the transition metal compound or as the additional component added after the completion of the grinding. The same, or a different, phosphorus compound as hereinbefore defined can be used as both of such additional components.

If a further quantity of an additional compound is incorporated in a catalyst system which includes a transition metal compound which has been ground with an additional compound, it is desirable that this further quantity of additional compound is not allowed to contact the transition metal compound in the absence of at least some of the organo-metallic compound which is component (2) of the catalyst. Indeed, with the exception of the grinding process, it is generally preferred that the transition metal compound is not allowed to contact the phosphorus compound or the electron donor compound in the absence of the organo-metallic compound which is component (2) of the catalyst. The grinding of the transition metal compound and the phosphorus compound and/or electron donor compound is desirably effected using a molar excess of the transition metal compound, for example a molar ratio of transition metal compound to phosphorus compound or electron donor compound of 6:1; 9:1 or even greater.

A preferred catalyst system in accordance with the present invention comprises 1) a solid compound of a transition metal wherein the said metal has a valency below its maximum; (2) an aluminium trihydrocarbyl, an aluminium dihydrocarbyl hydride, an aluminium hydrocarbyl halide, an aluminium hydrocarbyl sulphate or an aluminium hydrocarbyl oxyhydrocarbyl; and (3) a trivalent phosphorus compound of the formula

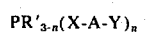

where R′, X, A, Y and n are as hereinbefore defined, wherein the solid transition metal compound (1) has been modified by effecting grinding, preferably dry ball-milling, of the solid transition metal compound (1) with at least one additional compound which is either a phosphorus compound (3) or an electron donor compound of the type which affects the catalyst activity and/or stereospecificity.

A further preferred catalyst system in accordance with the present invention comprises (1) a solid compound of a transition metal wherein said metal has a valency below its maximum, (2) an aluminium trihydrocarbyl, an aluminium dihydrocarbyl hydride, an aluminium hydrocarbyl halide, an aluminium hydrocarbyl sulphate or an aluminium hydrocarbyl oxyhydrocarbyl; (3) a phosphorus compound of the formula
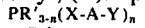
where R′, X, A, Y and n are as hereinbefore defined and optionally (4) an electron donor compound of the type which effects the catalyst activity and/or stereospecificity, wherein the solid transition metal compound (1) has been modified by effecting grinding, preferably dry ball-milling, of the solid transition metal compound (1) with at least one compound which is a phosphorus compound (3), or an electron donor compound (4), and the catalyst contains a quantity of either the component (3) or component (4) or both components (3) and (4) in addition to the component (3) and/or (4) which is ground with the solid transition metal compound (1); said additional quantity of component (3) and/or (4) not being allowed to contact the modified transition metal compound in the absence of at least some of the organo-metallic compound (2).

Electron donors which may be used to modify the catalyst have been extensively described in the literature and the choice of a suitable electron donor can be made from those which have been described, although it will be realised that the effect of, and the optimum conditions for using, an electron donor will depend on the particular electron donor selected. Catalyst systems including electron donor compounds or complexes including electron donors are disclosed inter alia in British Pat. Nos. 803,198; 809,717, 880,998; 896,509;

920,118; 921,954; 933,236; 940,125; 966,025; 969,074; 971,248; 1,013,363; 1,049,723; 1,122,010; 1,150,845 and 1,208,815, Dutch Patent Application 70,15555 and German Patent Application 2,130,314.

It will be appreciated that the characteristics of the catalyst systems are dependent on a number of factors and that various phosphorus compounds of the type hereinbefore defined can produce catalysts having different activity and stereospecificity.

The present invention also provides new trivalent phosphorus compounds having the formula $$PR'_{3-n}(X-A-Y)_n$$

wherein
R' is halogen, a hydrocarbyl group or the group —$NR_2$ or -OR where R is a hydrocarbyl group;
X i -O-, -S- or -NR-;
A is a bivalent organic radical such that X and Y are separated by not more than 3 carbon atoms;
Y is -OR, -SR, $-NR_2$, $-PR_2$ or a heterocyclic ring system whereof the heteroatom is O, S, N or P; and
n is 1, 2 or 3.

Specifically there are provided as new materials compounds having the formulae I to VIII as hereinbefore defined.

A particular preferred feature of this aspect of the present invention is the provision of compounds of the general formula $$P(X-A-Y)_3$$

Such compounds include the compounds represented by formulae I, IV and VI as hereinbefore defined.

As a further feature of the present invention, phosphorus compounds of the type defined can be prepared by the reaction of a compound H(X-A-Y) or a salt thereof, particularly the alkali metal salt, and a trivalent phosphorus compound PR'R"R''' where R'R" and R''' are independently halogen, hydrocarbyl, $-NR_2$ or -OR. Preferably the trivalent phosphorus compound is of the type wherein all the groups R', R" and R''' are the same.

The reaction between the compound PB'B"B''' and the compound H(X-A-Y) or the salt thereof can be carried out in an inert diluent such as benzene, petroleum ether or diethyl ether or in the absence of a diluent, in an inert atmosphere such as argon or nitrogen, at a reaction temperature ranging from ambient, that is 15°–25°C, up to the boiling point of the diluent, or the boiling point of the mixture of reactants, which can be up to at least 240°C depending on the reactants. The reaction occurs with the displacement of the groups R', R" and R''' from the phosphorus compound as for example HR'. The extent of the reaction can be measured by titration of the displaced compound HR' if HR' is basic, e.g. an amine or by fractional distillation and collection, e.g. where HR' is ethanol. The reaction can proceed with the formation of a mixture of phosphorus compounds which can be separated by distillation under reduced pressure.

Phosphorus compounds of formulae I, II, IV and VI have been characterized by elemental analysis, boiling point and density, and compounds of formulae V, VII and VIII by boiling point and density. Nuclear magnetic resonance data on the compounds of formulae IV, V, VI and VII was consistent with the formulae attributed to these materials.

the following examples are illustrative of the various aspects of the present invention.

EXAMPLE 1

Preparation of $P[OCH_2CH_2N(CH_3)_2]_3$ and $P[N(CH_3)_2][OCH_2CH_2N(CH_3)_2]_2$ 27 millimoles of phosphorus hexamethyltriamide ($P[N(CH_3)_2]_3$) were added to 54 millimoles of N,N dimethyl ethanolamine in a flask in which an argon atmosphere was being maintained. A water-cooled reflux condenser was fitted to the flask which was heated on an oil bath at about 100°C whilst passing a stream of argon through the system. Dimethylamine was evolved and removed in the argon gas stream and the progress of the reaction was followed by titration of the dimethylamine with aqueous normal sulphuric acid. A total of 55.5 millimoles of base were evolved.

The mixture was then subjected to fractionation at a pressure of 0.2 mm of mercury when 6.2 millimoles of a compound identified as being of formula II were first recovered at a temperature between 68 and 70°C followed by 8.7 millimoles of a compound identified as being of formula I at a temperature between 89° and 92°C. The yield of the two compounds was 55% based on the original phosphorus compound. The residual contents of the reaction flask were a further quantity of the compound of formula I. Analysis of the contents of a cold trap included in the apparatus revealed 6 millimoles of a base which was believed to be unreacted dimethyl ethanolamine. Infra-red analysis of the two products revealed the presence of a minor proportion of impurities containing P=O and P-H bonding. The compounds were subjected to elemental analysis, the results of which were consistent with the formulae attributed to them.

EXAMPLE 2

Preparation of $P[N(CH_3)_2]_2 [OCH_2CH_2N(CH_3)_2]$

Into a reaction flask were placed, under an atmosphere of argon, 2 millimoles of phosphorus hexamethyltriamide in 20 ml of benzene and 2 millimoles of N,N dimethylethanolamine in 10 ml of benzene. The mixture was heated under reflux in a stream of argon and the progress of the reaction was followed by titration of the dimethylamine reaction by-product with N/5 aqueous sulphuric acid. A further 20 ml of benzene was added when the reaction mixture boiled dry and the reaction was continued. After boiling dry again, a further 20 mls of benzene was added and the reaction was complete when a total of 2 millimoles of dimethylamine had been displaced. The reaction product which was believed to be of formula III, was a yellow oil which was soluble in benzene.

EXAMPLE 3

Preparation of

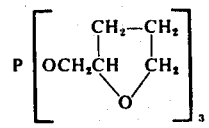

330 millimoles of tetrahydrofurfuryl alcohol were added, over a period of half an hour, to 300 milligramme atoms of sodium metal in 100 ml ether under nitrogen. A white solid was formed and the mixture was stirred. When the evolution of hydrogen was complete, 100 millimoles of phosphorus trichloride in 50 ml of ether were added over a period of half an hour. The ether boiled vigorously. The sodium chloride reaction product was allowed to settle overnight and the ether solution was decanted off. The sodium chloride was washed 4 times with ether to give a total of 750 ml of ether solution. The ether was distilled off at atmospheric pressure and the residue separated by fractionation in vacuo. The starting materials were first recovered followed by the reaction product. Elemental analysis and the nuclear magnetic resonance spectrum of the reaction product was consistent with a material of formula IV.

EXAMPLE 4

Preparation of $P[N(CH_3)_2]_2$

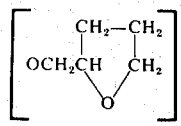

50 millimoles of phosphorus hexamethyltriamide $(P[N(CH_3)_2]_3)$ were added to 50 millimoles of tetrahydrofurfuryl alcohol under an atmosphere of nitrogen. The mixture was heated under a water-cooled reflux condenser, and a stream of nitrogen. By-product dimethylamine was removed by the nitrogen stream and titrated with N sulphuric acid. Over a period of 10 hours, the temperature of the oil bath on which the mixture was being heated was raised to 240°C and a total of 26 milimoles of dimethylamine was displaced and measured by titration. The reaction mixture was separated by fractionation in vacuo to give 4.7 grammes of product the nuclear magnetic resonance spectrum of which was consistent with a product of formula V.

EXAMPLE 5

Preparation of $P[OCH_2CH_2OCH_3]_3$ and $P(OC_2H_5)(OCH_2CH_2OCH_3)_2$ 300 millimoles of monomethylglycol were added to 100 millimoles of triethylphosphite under nitrogen. The mixture was heated to about 90°C with a fractionating column and condenser attached. 13.8 ml of ethanol was distilled over and the mixture remaining was then subjected to fractional distillation in vacuo. 7.8 grammes of a product having a nuclear magnetic resonance spectrum consistent with a product of formula VII was first obtained, followed by 1.4 grammes of a mixture of compounds and then 13.6 grammes of a product, the analysis and nuclear magnetic resonance spectrum of which was consistent with a product of formula VI.

EXAMPLE 6

Preparation of $P[N(CH_3)_2]_2$ $[N(CH_3)CH_2CH_2N(CH_3)_2]$ 50 millimoles of phosphorous hexamethyltriamide $(P[N(CH_3)_2]_3)$ and 50 millimoles of N,N,N'-trimethylethylenediamine were mixed under nitrogen and heated under a water-cooled reflux condenser with a stream of nitrogen being passed over the reactants. The dimethylamine removed as a reaction by-product by the nitrogen was titrated with N sulphuric acid, a total of 18 millimoles of base being titrated. The reaction was terminated and the mixture subjected to fractional distillation in vacuo to recover first any unreacted materials and then 2.9 grammes of the reaction product. The product was believed to be of Formula VIII.

Various characteristics of the products obtained in Examples 1 to 6 were determined and these are set out in Table 1.

Table 1

| Compound Reference (a) | | Elemental Analysis (wt %) | | | | | Boiling Point (°C/mmHg) | Density (g/cm³) | NMR (c) |
|---|---|---|---|---|---|---|---|---|---|
| | | C | H | N | O | P | | | |
| I | calc. (b) | 48.7 | 10.2 | 14.2 | 16.2 | 10.4 | 89–92/0.2 | 0.984 | ND |
| | found | 48.4 | 10.6 | 15.0 | 15.7 | 10.3 | | | |
| II | calc. (b) | 47.7 | 10.4 | 16.7 | 12.7 | 12.3 | 68–70/0.2 | 0.976 | ND |
| | found | 47.3 | 10.4 | 16.3 | 14.1 | 11.9 | | | |
| IV | calc. (b) | 53.9 | 8.2 | — | 28.7 | 9.3 | 161–164/0.2 | 1.07 | YES |
| | found | 54.0 | 8.1 | — | 28.2 | 9.7 | | | |
| V | | | | | | | 72–75/0.15 | 1.02 | YES |
| VI | calc. (b) | 42.2 | 8.3 | — | 37.5 | 12.1 | 98–99/0.28 | 1.08 | YES |
| | found | 42.0 | 8.3 | — | 37.1 | 12.6 | | | |
| VII | | | | | | | 72–75/0.2 | 1.076 | YES |
| VIII | | | | | | | 87–90/0.23 | 0.919 | ND |

Notes to Table 1
(a) The compound references are as follows:-
I product of Example 1, second material to be distilled off, formula corresponds to Formula I
II product of Example 1, first material to be distilled off, formula corresponds to Formula II
IV product of Example 3, formula corresponds to Formula IV
V product of Example 4, formula corresponds to Formula V
VI product of Example 5, second material to be distilled off, formula corresponds to Formula VI
VII product of Example 5, first material to be distilled off, formula corresponds to Formula VII
VIII product of Example 6, formula corresponds to Formula VIII
b) calculated on the basis of formula attributed to compound
c) ND means not determined.
YES means NMR spectrum consistent with formula given.

EXAMPLES 7 TO 18

The products of Examples 1 to 6 were then used as olefine polymerisation catalyst third components. The effect of the phosphorus compounds was tested in propylene polymerisations using triethyl aluminium and a commercially available form of titanium trichloride manufactured by Toho Titanium Company of Japan and identified as TAC 131. (This material is believed to be obtained by the reduction of TiCl₄ with aluminium metal and thereafter ball-milling the dry powder.)

Comparative examples, indicated by letters, were carried out in a similar manner either omitting the phosphorus compound (A & B) or using a different compound.

TABLE 2

| Example or Comparative Example | Phosphorus Compound Reference | Amount (mmol/l) | AlEt₃ (mmol/l) | Conversion to solid (g/mmol Ti) (f) | Soluble Yield (%) (g) |
|---|---|---|---|---|---|
| 7 | I | 0.25 | 4 | 30.5 | 13 |
| 8 | I | 0.8 | 8 (e) | 26.5 | 11 |
| 9 | II | 0.5 | 4 | 39 | 13.5 |
| 10 | II | 1 | 8 (e) | 30 | 11.5 |
| 11 | III | 1 | 4 | 28 | 17.5 |
| 12 | IV | 0.25 | 3.5 | 20 | 18 |
| 13 | IV | 0.75 | 7 | 15.5 | 14.5 |
| 14 | V | 0.5 | 4 | 33.5 | 14.5 |
| 15 | V | 1 | 4 | 14 | 13 |
| 16 | VI | 0.125 | 3.5 | 22 | 19.5 |
| 17 | VII | 0.2 | 3.5 | 15 | 20 |
| 18 | VIII | 0.5 | 4 | 14 | 16 |
| A | None | — | 3.5 | 22.5 | 30.5 |
| B | None | — | 4 | 35 | 29 |
| C | PHM (d) | 0.1 | 4 | 5 | 30 |

Notes to Table 2
(d) PHM is phosphorous hexamethyltriamide (P[N(CH₃)₂]₃)
(e) Polymerisation would not proceed with 4 millimoles AlEt₃
(f) Based on solid polymer only
(g) % based on total polymer (solid + $_{soluble}$) formed.

A polymerisation flask equipped with efficient stirrer and a water jacket was dried carefully and 1 liter of an inert hydrocarbon diluent having a boiling range of about 170°–175°C was introduced. The diluent was evacuated at 60°C purged with nitrogen and evacuated, which treatment effectively reduced the water and oxygen contents of the diluent to below 10 ppm by weight. The diluent was then saturated with propylene to one atmosphere pressure. The propylene used was obtained by the purification of an initial sample of propylene, containing methylacetylene and allene as impurities at levels well below 10 ppm by weight, by passing this propylene through a column of activated alumina. Triethyl-aluminium was introduced in the proportions indicated in Table 2 followed by the phosphorus compound to be tested. After half hour 2 millimoles of TiCl₃ were introduced. The pressure in the reaction vessel was maintained at one atmosphere by supply of propylene from a burette. After a further 2.5 hours the run was terminated with 10 ml of isopropanol and a sample of supernatant liquid extracted for determining the concentration of soluble polymer. The solid was filtered and washed three times with petrol ether and dried in a vacuum oven at 120°C for an hour. The yield of solid plus calculated soluble polymer equalled within experimental error the propylene lost from the burette.

The results obtained are set out in Table 2.

EXAMPLES 19 TO 24

Propylene polymerisations were also carried out with TiCl₃ obtained by reduction of TiCl₄ with ethylaluminium sesquichloride by the addition of 0.9 moles of the aluminium compound to 1.0 mole of TiCl₄, both compounds being dissolved in inert hydrocarbon diluent and maintained at 0°C during the preparation. The results obtained are set out in Table 3, in which the reference letters have the same significance as in Table 2.

TABLE 3

| Example or Comparative Example | Phosphorus Compound Reference | Amount (mmol/l) | AlEt₃ (mmol/l) | Conversion to solid (g/mmol Ti) (f) | Soluble Yield (%) (g) |
|---|---|---|---|---|---|
| 19 | I | 0.25 | 4 | 26 | 21.5 |
| 20 | II | 0.25 | 4 | 27 | 25 |
| 21 | IV | 0.25 | 4 | 13.5 | 24 |
| 22 | VI | 0.25 | 4 | 19 | 25 |
| 23 | VII | 0.25 | 4 | 16 | 20.5 |
| 24 | VIII | 0.25 | 4 | 17 | 21.5 |
| D | PHM (d) | 0.25 | 4 | 2.5 | 16.5 |
| E | None | — | 4 | 34 | 38.5 |

EXAMPLES 25 – 29

20 g (100 millimoles) of titanium trichloride manufactured by Toho Titanium Company of Japan and identified as TAC 141 were stirred in 100 cm³ pentane under nitrogen and 3.7 millimoles of the phosphorus compound, reference I, were added over ½ hour. The mixture was transferred into a stainless steel ball-mill with washing, and was then dried, in the mill, by removing the pentane under vacuo. The mill was 6 inches long and 3 inches in diameter and contained 200 stainless steel balls of half-inch diameter and 200 stainless steel balls of quarter-inch diameter. The mill was rotated at 120 rpm for 24 hours.

The catalyst was tested in propylene polymerisations using conditions similar to those described in Examples 7 to 18 except that 8 millimoles of aluminium triethyl was used. In one polymerisation, no further phosphorus compound was used apart from that introduced by the milling step. In other polymerisations a further quantity of a phosphorus compound or an electron donor compound was added in the manner set out in Examples 7 to 18. The nature and amount of the further addition of phosphorus compound or electron donor compound are set out in Table 4 together with the results obtained.

TABLE 4

| Example | Further Compounds Added | | Conversion to solid | Soluble Yield |
|---|---|---|---|---|
| | Compound (h) | Amount (mmol/l) | (g/mmol) (f) | (%) (g) |
| 25 | none | Nil | 47 | 12.3 |
| 26 | I | 0.33 | 36.5 | 8.8 |
| 27 | II | 0.33 | 46.5 | 7.9 |
| 28 | Isoquinoline | 4 | 39.5 | 10.4 |
| 29 | TMED | 1 | 26.2 | 6.9 | h) I is the phosphorus compound of Formula I
II is the phosphorus compound of Formula II
TMED is tetramethylethylenediamine.

EXAMPLES 30 and 31

The transition metal compound was ball-milled with an electron donor compound.

The transition metal compound was TAC 121 titanium trichloride supplied by the Toho Titanium Company of Japan and the electron donor was triphenyl phosphine oxide. The compounds were added directly to the mill in the solid form, the titanium trichloride being added first. The mill used was 9 inches long and 5.1 inches diameter and contained 685 steel balls of ½ inch diameter. The molar ratio of titanium trichloride to triphenyl phosphine oxide was 6:1 and milling was effected at 64 rpm for 65 hours. A nitrogen atmosphere was maintained in the mill at all times during loading, milling and unloading.

Polymerisations were carried out as described in respect of Example 26 with the addition of the indicated quantity of the phosphorus compound, reference 1. A comparative example (Example F) was carried out in the absence of a further phosphorus compound. The results obtained are set out in Table 5.

TABLE 5

| Example or Comparative Example | Phosphorus Compound Amount (mmol/l) | Conversion to Solid g/mmol (f) | Soluble Yield % (g) |
|---|---|---|---|
| F | Nil | 75 | 11.4 |
| 30 | 0.33 | 59.5 | 5.2 |
| 31 | 0.66 | 62.5 | 4.2 |

I claim:
1. An olefine polymerisation catalyst consisting essentially of
   1. one molecular proportion of a solid halide of titanium, vanadium or zirconium wherein the metal has a valency below its maximum,
   2. between about 1.75 and about 4 molecular proportions of a Grignard reagent which is substantially ether free, $Mg[Al(C_2H_5)_4]_2$, $Mg(C_6H_5)_2$, a lithium aluminium tetraalkyl, an aluminium hydrocarbyl halide, an aluminium hydrocarbyl sulphate, an aluminium hydrocarbyl oxyhydrocarbyl, an aluminium trihydrocarbyl or a dihydrocarbyl aluminium hydride, and
   3. up to $C_A/f$ molecular proportions of a trivalent phosphorus compound of the formula $PR'_{3-n}(X-A-Y)_n$ wherein

R' is halogen, a hydrocarbyl group, the group $-NR_2$ or the group $-OR$;

X is -O-, -S- or -NR-;

A is a bivalent hydrocarbyl radical such that X and Y are separated by not more than 3 carbon atoms;

Y is -OR, -SR, $-NR_2$, $-PR_2$, a pyridyl radical, a quinolyl radical, an isoquinolyl radical, a furyl radical or a tetrahydrofuryl radical;

R is a hydrocarbyl group;

$C_A$ is the molecular proportion of component 2) and;

f is the number of functional groups in the phosphorus compound which contain O or N, there being at least one such functional group in the phosphorus compound N is 1, 2 or 3.

2. The catalyst of claim 1 wherein component 1) is titanium trichloride.

3. The catalyst of claim 1 wherein component 2) is an aluminium trihydrocarbyl or an aluminium dihydrocarbyl hydride.

4. The catalyst of claim 1 wherein component 1) is titanium trichloride and component 2) is an aluminium trihydrocarbyl.

5. The catalyst of claim 4 wherein component 2) is aluminium triethyl.

6. The catalyst of claim 5 wherein titanium trichloride is present in a concentration of $C_T$ millimoles/liter; aluminium triethyl is present in a concentration of $C_E$ millimoles/liter and component 3) is present in a concentration in the range $$\frac{C_T}{4f} \text{ to } \frac{C_E}{2f} \text{ millimoles/litre.}$$

7. The catalyst of claim 5 wherein the phosphorus compound is $P[OCH_2CH_2N(CH_3)_2]_3$;
$P[N(CH_3)_2] [OCH_2CH_2N(CH_3)_2]_2$;
$P[N(CH_3)_2]_2[OCH_2CH_2N(CH_3)_2]$;

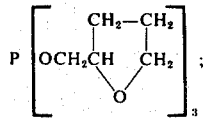

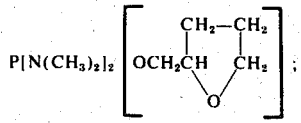

$P[OCH_2CH_2OCH_3]_3$;
$P[OC_2H_5] [OCH_2CH_2OCH_3]_2$ or
$P[N(CH_3)_2]_2[N(CH_3)CH_2CH_2N(CH_3)_2]$.

8. The catalyst of claim 1 wherein R is a methyl or ethyl group.

9. The catalyst of claim 1 wherein R' is an alkoxy or dialkyl amino group.

10. The catalyst of claim 1 wherein component 1) has been ground in the dry state.

11. The catalyst of claim 10 wherein the solid halide which is component 1) has been ground with at least one compound which is [a trivalent phosphorus compound of the type
$PR'_{3-n}(X-A-Y)_n$, where R', X, A, Y and n are all as defined] at least part of component 3), or triphenyl phosphine oxide, in a molar ratio of solid halide to component 3) or triphenyl phosphine oxide of at least 6:1.

12. The catalyst of claim 11 wherein in addition to the materials ground with component 1), the catalyst further contains a further quantity of at least one compound selected from the group consisting of triphenyl phosphine oxide, pyridine, quinoline, isoquinoline, tetramethylethylenediamine and component 3), said quantity being a minor amount sufficient to improve the catalyst activity, stereospecificity or both and the quantity of component 3) being the remainder of component 3).

13. The catalyst of claim 12 wherein component 1) is not allowed to contact triphenyl phosphine oxide, pyridine, quinoline, isoquinoline, tetramethylethylenediamine or component 3) in the absence of component 2) of the catalyst other than when the solid halide is ground with the triphenyl phosphine oxide, pyridine, quinoline, isoquinoline, tetramethylethylenediamine, or component 3).

14. The catalyst of claim 11 consisting essentially of
   1. titanium trichloride;
   2. an aluminium trihydrocarbyl or an aluminium dihydrocarbylhydride; and
   3. a phosphorus compound of the formula

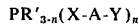

wherein component 1) of the catalyst is the product obtained by dry ball-milling titanium trichloride with at least one additional compound which is either component 3) or triphenyl phosphine oxide.

15. The catalyst of claim 14 further containing
   a. a component 4) selected from the group consisting or pyridine, quinoline, isoquinoline, tetramethylethylenediamine triphenylphosphine oxide, and wherein component 1) is titanium trichloride which has been dry ball-milled with at least one compound selected from the group consisting of component 3), component 4), and mixtures thereof in a molar ratio of component 1) to component 4) of at least 6:1; and
   b. in addition to said compound dry ball-milled with titanium trichloride, the catalyst contains an additional quantity of component 3), component 4), or mixtures thereof which quantity has not been allowed to contact component 1) in the absence of at least some of component 2), the quantity of component 4) being a minor amount sufficient to improve the catalyst activity, stereospecificity, or both, and the quantity of component 3) being the remainder of component 3).

16. In an olefine polymerisation catalyst of
   1. a solid halide of titanium, vanadium or zirconium wherein the metal has a valency below its maximum,
   2. a Grignard reagent which is substantially ether free, $Mg[Al(C_2H_5)_4]_2$, $Mg(C_6H_5)_2$, a lithium aluminium tetraalkyl, an aluminium hydrocarbyl halide, an aluminium hydrocarbyl sulphate, an aluminium hydrocarbyl oxyhydrocarbyl, an aluminium trihydrocarbyl or a dihydrocarbyl aluminium hydride, the improvement of adding up to $C_A/f$ molecular proportions of a trivalent phosphorus compound of the formula

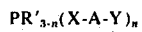

wherein
   R' is halogen, a hydrocarbyl group, the group $-NR_2$ or the group $-OR$;
   X is $-O-$, $-S-$ or $-NR-$;
   A is a bivalent hydrocarbyl radical such that X and Y are separated by not more than 3 carbon atoms;
   Y is $-OR$, $-SR$, $-NR_2$, $-PR_2$, a pyridyl radical, a quinolyl radical, an isoquinolyl radical, a furyl radical or a tetrahydrofuryl radical;
   R is a hydrocarbyl group;
   $C_A$ is the molecular proportion of component 2) and;
   $f$ is the number of functional groups in the phosphorus compound which contain O or N, there being at least one such functional group in the phosphorus compound, N is 1, 2 or 3.

17. The catalyst of claim 16 wherein component 1) is titanium trichloride.

18. The catalyst of claim 16 wherein component 2) is an aluminium trihydrocarbyl or an aluminium dihydrocarbyl hydride.

19. The catalyst of claim 16 wherein component 1) is titanium trichloride and component 2) is an aluminium trihydrocarbyl.

20. The catalyst of claim 19 wherein component 2) is aluminium triethyl.

21. The catalyst of claim 20 wherein titanium trichloride is present in a concentration of $C_T$ millimoles/ liter; aluminium triethyl is present in a concentration of $C_E$ millimoles/liter and component 3) is present in a concentration in the range $$\frac{C_T}{4f} \text{ to } \frac{C_E}{2f} \text{ millimoles/litre.}$$

22. The catalyst of claim 20 wherein the phosphorus compound is

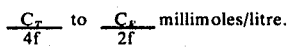

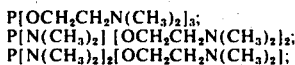

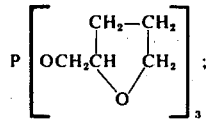

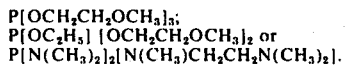

23. The catalyst of claim 16 wherein R is a methyl or ethyl group.

24. The catalyst of claim 16 wherein R' is an alkoxy or dialkyl amino group.

25. The catalyst of claim 16 wherein component 1) has been ground in the dry state.

26. The catalyst of claim 25 wherein the solid halide which is component 1) has been ground with at least one compound which is at least part of component 3), or triphenyl phosphine oxide, in a molar ratio of solid halide to component 3) or triphenyl phosphine oxide of at least 6:1.

27. The catalyst of claim 26 wherein in addition to the materials ground with component 1), the catalyst further contains a quantity of at least one compound selected from the group consisting of triphenyl phosphine oxide, pyridine, quinoline, isoquinoline, tetramethylethylenediamine and component 3), said quantity being a minor amount sufficient to improve the catalyst activity, stereospecificity or both and the quantity of component 3) being the remainder of component 3).

28. The catalyst of claim 27 wherein component 1) is not allowed to contact triphenyl phosphine oxide, pyridine, quinoline, isoquinoline, tetramethylethylenediamine or component 3) in the absence of component 2) of the catalyst other than when the solid halide is ground with the triphenyl phosphine oxide, pyridine, quinoline, isoquinoline, tetramethylethylenediamine, or component 3).

29. The catalyst of claim 26 consisting essentially of
1. titanium trichloride;
2. an aluminium trihydrocarbyl or an aluminium dihydrocarbylhydride; and
3. a phosphorus compound of the formula $$PR'_{3-n}(X-A-Y)_n$$

wherein component 1) of the catalyst is the product obtained by dry ball-milling titanium trichloride with at least one additional compound which is either component 3) or triphenyl phosphine oxide.

30. The catalyst of claim 29 further containing
a. a component 4) selected from the group consisting of pyridine, quinoline, isoquinoline, tetramethylethylenediamine and triphenylphosphine oxide, and wherein component 1) is titanium trichloride which has been dry ball-milled with at least one compound selected from the group consisting of component 3), component 4), and mixtures thereof in a molar ratio of component 1) to component 4) of at least 6:1; and
b. in addition to said compound dry ball-milled with titanium trichloride, the catalyst contains an additional quantity of component 3), component 4), or mixtures thereof which quantity has not been allowed to contact component 1) in the absence of at least some of component 2), the quantity of component 4) being a minor amount sufficient to improve the catalyst activity, stereospecificity, or both, and the quantity of component 3) being the remainder of component 3).

* * * * *